US007843682B2

(12) United States Patent
Leinen et al.

(10) Patent No.: US 7,843,682 B2
(45) Date of Patent: Nov. 30, 2010

(54) BLAST VENTING FOR ELECTRICAL DEVICE

(75) Inventors: Richard A. Leinen, Wilsonville, OR (US); Pieter Paulson, Portland, OR (US)

(73) Assignee: Levitron Manufacturing Co., Inc., Melville, NY (US)

( * ) Notice: Subject to any disclaimer, the term of this patent is extended or adjusted under 35 U.S.C. 154(b) by 85 days.

(21) Appl. No.: 12/256,451

(22) Filed: Oct. 22, 2008

(65) Prior Publication Data

US 2010/0097759 A1 Apr. 22, 2010

(51) Int. Cl.
*H01H 33/08* (2006.01)
*H01H 9/02* (2006.01)
*H02B 1/20* (2006.01)

(52) U.S. Cl. ....................... 361/652; 361/657; 218/157; 335/202

(58) Field of Classification Search ....................... None
See application file for complete search history.

(56) References Cited

U.S. PATENT DOCUMENTS

| | | | | |
|---|---|---|---|---|
| 4,485,283 | A * | 11/1984 | Hurtle | 218/22 |
| 5,192,227 | A | 3/1993 | Bales | |
| 5,360,129 | A * | 11/1994 | Lee | 220/1.5 |
| 5,574,624 | A * | 11/1996 | Rennie et al. | 361/676 |
| 5,773,755 | A * | 6/1998 | Iwatare | 174/17 VA |
| 6,037,555 | A | 3/2000 | Castonguay et al. | |
| 6,188,036 | B1 | 2/2001 | Arnold | |
| 6,198,063 | B1 * | 3/2001 | Kramer | 218/157 |
| 6,222,147 | B1 | 4/2001 | Doughty et al. | |
| 6,295,930 | B1 | 10/2001 | Kume et al. | |
| 6,614,339 | B2 | 9/2003 | Parry et al. | |
| 6,762,389 | B1 | 7/2004 | Crooks et al. | |
| 6,838,962 | B2 | 1/2005 | Leone et al. | |
| 6,924,721 | B2 * | 8/2005 | Afshari et al. | 335/202 |
| 7,009,132 | B1 * | 3/2006 | Shea et al. | 218/155 |
| 7,034,241 | B2 | 4/2006 | Fleege et al. | |
| 7,034,242 | B1 * | 4/2006 | Shea et al. | 218/157 |
| 7,488,915 | B2 * | 2/2009 | Pollitt et al. | 218/149 |
| 2009/0179010 | A1 * | 7/2009 | Asokan et al. | 218/157 |

FOREIGN PATENT DOCUMENTS

| | | | |
|---|---|---|---|
| JP | 06-096656 | A | 4/1994 |
| JP | 08-138514 | A | 5/1996 |
| KR | 20-1998-0042913 | U | 9/1998 |
| KR | 10-2006-009487 | A | 8/2006 |
| KR | 10-0693704 | B1 | 3/2007 |

OTHER PUBLICATIONS

International Search Report and Written Opinion for PCT Application No. PCT/US2009/061367, dated May 24, 2010, 11 pages.

* cited by examiner

*Primary Examiner*—Boris L Chervinsky
(74) *Attorney, Agent, or Firm*—Marger Johnson & McCollom PC

(57) ABSTRACT

An electrical component may include a vent located in a mounting portion of a case to vent a blast from within the case. A chassis may have a mounting site for an electrical component, wherein the mounting site includes a passage to receive a blast from the electrical component. A system may include a chassis having a mounting site to engage a mounting portion of a case for an electrical component, wherein the mounting portion of the case includes a vent, and the chassis forms at least a portion of a blast chamber to receive a blast from the vent.

20 Claims, 7 Drawing Sheets

BLAST VENTING FOR ELECTRICAL DEVICE

BACKGROUND

Electrical switching devices such as relays and circuit breakers are often encapsulated in cases to protect the operating mechanisms from dust, moisture and other environmental conditions, and to prevent technicians and others from contacting live electrical parts. Certain operating conditions may cause a blast or build-up of hot, pressurized gases and other materials within the case. For example, short circuits may cause contacts in relays or circuit breakers to melt or explode, thereby releasing hot gases and molten metal. As another example, an over current condition may cause the contacts in a circuit breaker to open, which may in turn, create a momentary arc between the contacts. The arc releases a blast of ionized air.

If the blast is not vented from inside the case, it may damage, destroy or interfere with the operation of the electrical device and/or cause the case to rupture, thereby scattering dangerous blast products. Thus, cases for electrical switching devices are often provided with a vent in the top or side of the case to enable a short circuit or other type of blast to escape from within the case. While venting the case may solve certain problems with the electrical switching device, it often causes other problems. For example, in an electrical enclosure housing multiple components, a blast from one device may be directed at another device, which in turn is damaged or destroyed by the blast.

Some other previous efforts to accommodate a blast from an electrical switching device have involved the use of complicated systems of baffles or dividers between components to direct the blast from one component away from other components. These systems, however, add cost and complexity, and may still create hazardous conditions.

DETAILED DESCRIPTION

Figure 1:
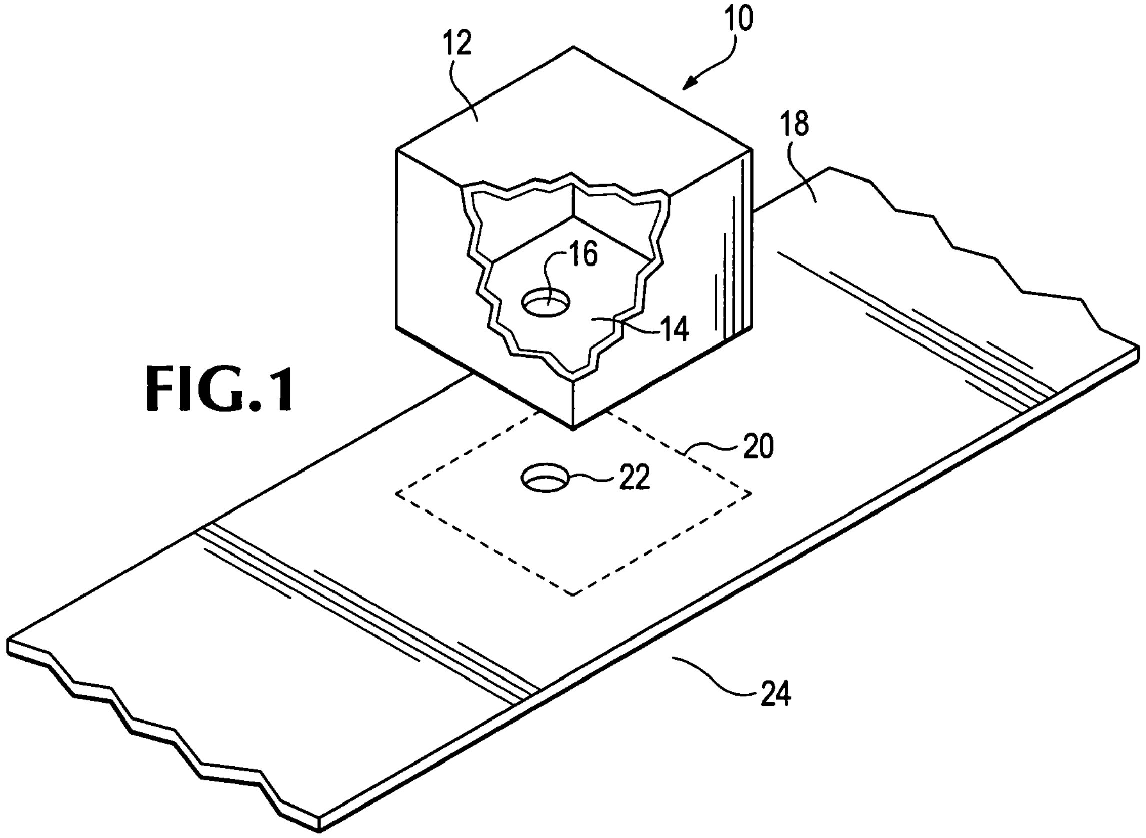
FIG. 1 illustrates an embodiment of a venting system for an electrical switching component according to the inventive principles of this patent disclosure.

FIG. 1 illustrates an embodiment of a venting system for an electrical switching component according to the inventive principles of this patent disclosure. The embodiment of FIG. 1 includes an electrical switching component 10 having an electrical switching device (not shown) substantially encapsulated in a case 12. The case has a mounting portion 14, which in this example is the bottom of the case 12. The mounting portion includes a vent 16 to enable gases and other material from a blast to escape from within the case. The embodiment of FIG. 1 also includes a chassis 18 having a mounting site 20 where the electrical switching device 10 is mounted to the chassis. The mounting site 20 includes a passage 22 to enable the blast from vent 16 to flow from the case through the chassis and into a blast diverting space 24.

FIG. 1 shows the electrical switching component 10 elevated above the chassis 18 so as not to obscure the details of the mounting site 20. When fully assembled, however, the electrical mounting portion 14 of switching component 10 is mounted to the mounting site 20 of the chassis 18 so the vent 16 is generally aligned with the passage 22.

The electrical switching device contained in the case is not shown in FIG. 1 so as not to obscure the mounting portion 14 or vent 16. The electrical switching device may be a relay, a circuit breaker, a manually actuated switch, a dimmer, or any other type of device or combination of devices that controls current to a load and which, in response to electrical stress such as a short circuit, over current condition, etc., or during normal operation, may produce a blast of gases, molten metal or any other matter that may damage or interfere with the operation of the device if not vented out of the case. A blast need not necessarily be a high pressure event, but may be, for example, a puff of ionized air generated by an arc caused by opening a switch on an inductive load.

The case 12 may be of any suitable size, shape, material, etc., for enclosing the specific type of electrical switching device. Some examples of suitable materials include various plastics, composites, glasses, metals, etc. commonly used for encapsulating relays, circuit breakers, switches, etc. The case 12 need not completely encapsulate the electrical switching device. For example, the case may include loose-fitting openings around electrical terminals that pass through the case, or there may be small gaps where different portions of the case are joined, or there may be imperfectly fit openings for access to potentiometers, dip switches and the like. Relatively small amounts of gas or other matter may escape from these openings without defeating the purpose of the vent 16.

The vent 16 may have any suitable form to vent gases or other material from the case. Some examples include a simple circular hole, a combination of holes to form a baffle, a pressure relief valve set to open only when the inside of the case reaches a certain internal pressure and/or temperature, a relatively thin or weak portion of the case that ruptures under pressure or high heat, an elastomeric material that opens to vent, but then recloses after venting, etc.

The mounting portion 14 in the embodiment of FIG. 1 is shown as a flat bottom portion of the case 12 to enable the case to be attached to the flat mounting site 20 on chassis 18, but countless variations are contemplated by the inventive principles of this patent disclosure. For example, in some embodiments, the mounting portion may be molded with a profile to fit in or on a rail or track such as a standard DIN rail. In other embodiments, the mounting portion may be shaped to plug into a relay socket. In an embodiment for a snap-in type circuit breaker, the mounting portion may include the flat bottom of the circuit breaker case which is bounded at one end by a hook to engage the panel and at the other end by the plug-in terminal to engage the power distribution bus.

The manner in which the electrical switching component 10 is attached to the chassis 18 is not limited to any particular technique and may depend on the configuration of the chassis 18 and/or the mounting portion 14 of the case 12. In an embodiment having two flat mating surfaces as shown in FIG. 1, any type of fasteners such as screws, rivets, clips, adhesive etc. may be used. Either or both surfaces may have interlocking tabs, slots, recesses, protrusions, etc. In embodiments that utilize plug-in sockets, the case may be held to the chassis by the force of mating contacts and or tabs in the case. These forces may be supplemented or replaced by hold-down clips or other fasteners. As another example, in embodiments that utilize mounting rails or tracks, the mounting portion 14 of the case 12 may simply slide into or on the track or rail.

The chassis 18 and mounting site are not limited to any particular configurations, although some specific examples are described below. In the embodiment of FIG. 1, the chassis 18 is shown as a flat mounting plate that can be fabricated from metal or any other suitable material, and the mounting site 20 is simply a portion of the plate matching the footprint of the case 12. In some other embodiments, the chassis may be in the form of a rail or a track in which any portion of the rail or track may be designated as a mounting site. In other embodiments, the chassis may be a socket having a mounting site that includes receptacles for electrical terminals and/or tabs on the mounting portion of the case. In yet other embodiments, a printed circuit board may serve as the chassis with a mounting site that includes drilled holes, plated holes, etc. to receive the electrical switching component in the form of a board mount relay, circuit breaker, etc. The chassis may be a free-standing chassis, or it may be mounted in, or integral with, an enclosure.

The passage 22 is shown as a simple circular hole in the embodiment of FIG. 1, but the inventive principles contemplate many different forms. The passage may include multiple holes, channels, tubes, valves, etc. to direct the blast from the vent 16 to the blast diverting space 24. As with the vent 12, the passage 22 may be implemented as a relatively weak or thin portion of the chassis that ruptures under pressure or heat.

The blast diverting space 24 may be any suitable open or enclosed space. For example, it may be specifically designed to receive the blast, or it may utilize an existing space in the chassis or an enclosure in which the chassis is mounted. The blast diverting space may be empty, or it may be fully or partially filled with material to absorb, diffuse, cool, redirect, or otherwise process the blast.

Figure 2B:
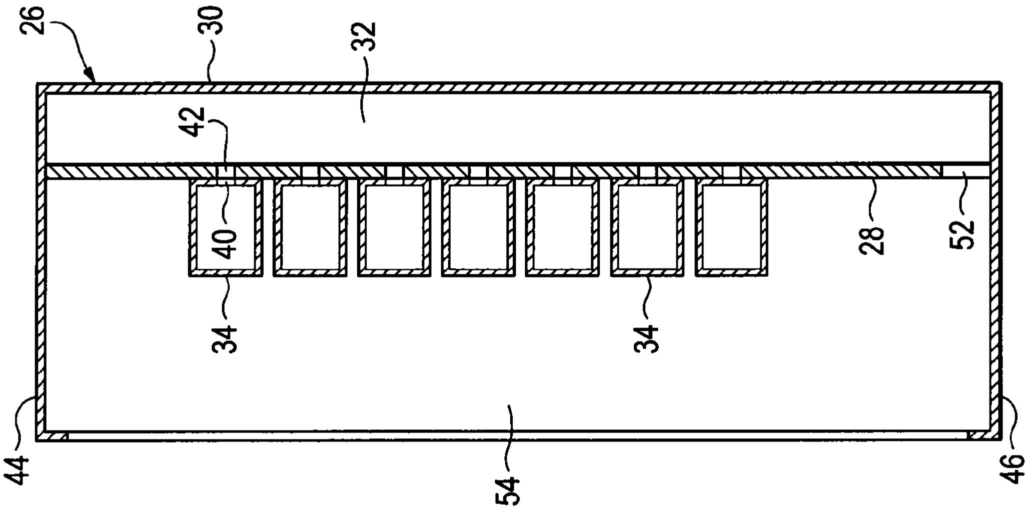
FIG. 2B is a cross section taken through line AA of the embodiment of FIG. 2A.
Figure 2A:
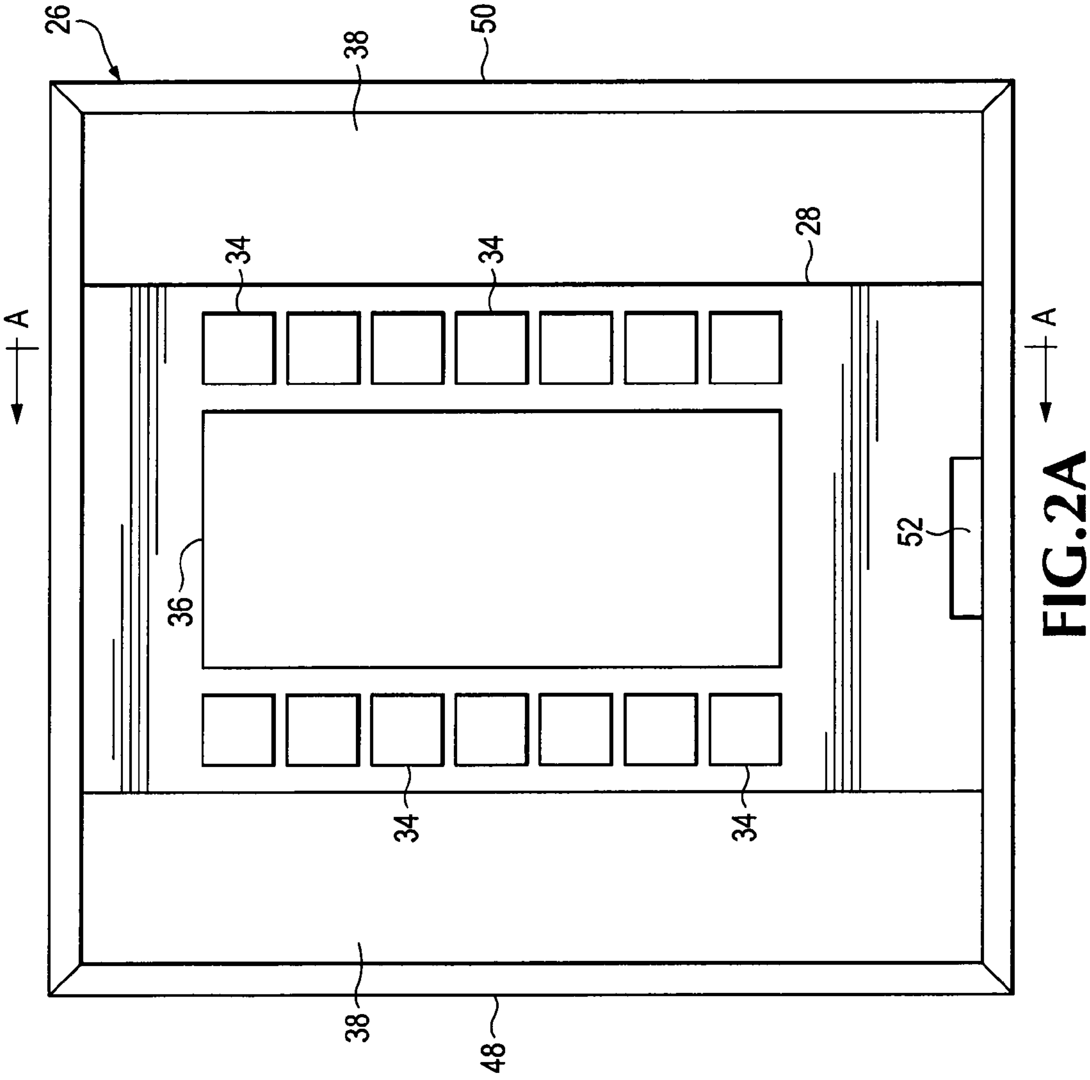
FIG. 2A is a front view of another embodiment of a venting system according to the inventive principles of this patent disclosure.

FIGS. 2A and 2B (which may be referred to collectively as FIG. 2) illustrate another embodiment of a venting system according to the inventive principles of this patent disclosure. The embodiment of FIG. 2 is directed to a relay control panel that is housed in a sheet metal enclosure 26. The electrical components are attached to a mounting plate 28 which, as best seen in FIG. 2B, is spaced apart from the back wall 30 of the enclosure 26 to form a space 32 which is utilized as a blast chamber as described below. The mounting plate 28 may be positioned relative to the back wall using spacers, folded sheet metal, or any other suitable technique.

Referring to FIG. 2A, the relay control panel may include any number of relays 34 which, in this example, are arranged in two rows on either side of low-voltage control circuitry 36. The low-voltage control circuitry may include a printed circuit board having one or more microprocessors, communication interfaces, timing circuits, interface circuitry for photo sensors, occupancy sensors and the like, as well as circuitry to drive the coils of relays 34. High voltage wiring areas 38 on either side of the enclosure 26 provide space for the connection of line and load wires to the relay contact terminals. Though not shown, the enclosure may include a front panel to fully enclose the panel.

In the example embodiment of FIG. 2, the relays may have molded plastic cases with mounting portions implemented as flat bottom flanges that mount directly to designated sites on the mounting plate 28 using any suitable attachment technique. High-voltage connections may be made to the relay contacts through spade-lug connectors or screw terminals on the tops of the relays, while low voltage connections may be made to the relay coils through similar terminals on the tops of the relays.

In other embodiments, the relays may be attached in the form of relay cards having one or more relays mounted on a printed circuit board along with terminal blocks and other support circuitry. Each relay card may have a terminal header to couple the card to corresponding terminals of the low voltage control circuitry 36. The relay card may also be attached to the mounting panel with spacers, stand-offs, a sheet of insulated material, etc.

In the embodiment shown in FIG. 2B, each relay has a vent hole 40 in the bottom of its case that aligns with a corresponding hole 42 in the mounting plate 28. In an embodiment having relay cards, each printed circuit board may have a corresponding hole that aligns with both of the holes 40 and 42. Depending on the manner in which the printed circuit board is attached to the mounting plate, i.e., if the card is spaced apart from the plate, a tube or other apparatus may be included to direct the blast from the holes in the relay and printed circuit board to the hole in the mounting plate 28.

As best seen in FIG. 2B, any blast from one of the relays 34 is directed into a blast chamber 32 formed between the mounting plate 28 and the back wall 30 of the enclosure, as well as a portion of the top wall 44 and bottom wall 46 and the side walls 48 and 50 of the enclosure. A vent 52 is located at the lower end of the mounting plate 28 and opens the blast chamber into the main volume 54 of the enclosure. Upon release from the vent hole 40, gases and/or other matter in a blast from relay 34 is dispersed throughout the blast chamber 32 and may eventually travel downward to vent 52. If and when the blast makes its way through vent 52 and into the main volume 54 of the enclosure 28, it may have dissipated enough to prevent damage or interfere with the operation of other components located within the enclosure. For example, hot exhaust gases may have cooled, ionized air may have become de-ionized, and molten metal may have solidified, clung to the back wall of the enclosure, or fallen to the bottom of the blast chamber.

The blast chamber 32 may be empty, or it may be fully or partially filled with a material such as loose flame-resistant fiberglass insulation batting to further contain the blast.

The embodiment of FIG. 2 may provide several benefits depending on the implementation. For example, the system may require few, if any additional components. Electrical enclosures typically include mounting plates that are attached to the back wall of the enclosure with spacers or standoffs. A mounting plate is typically fabricated by a stamping operation in which the plate is cut to size and any necessary holes punched in one stamping operation. The additional holes for the vents may be fabricated in the same stamping operation. Likewise, the vent holes for the relays maybe formed in the same molding operation used to create the relay case. Other than providing electrical isolation between components on the mounting plate and the back wall of the enclosure, the space between the plate and the enclosure may essentially be wasted space. Thus, at low additional cost, and perhaps even no additional cost, the embodiment of FIG. 2 may provide effective blast containment by modifying existing components and utilizing previously wasted portions of an electrical enclosure to solve a problem that has troubled panel designers for years.

Figure 3:
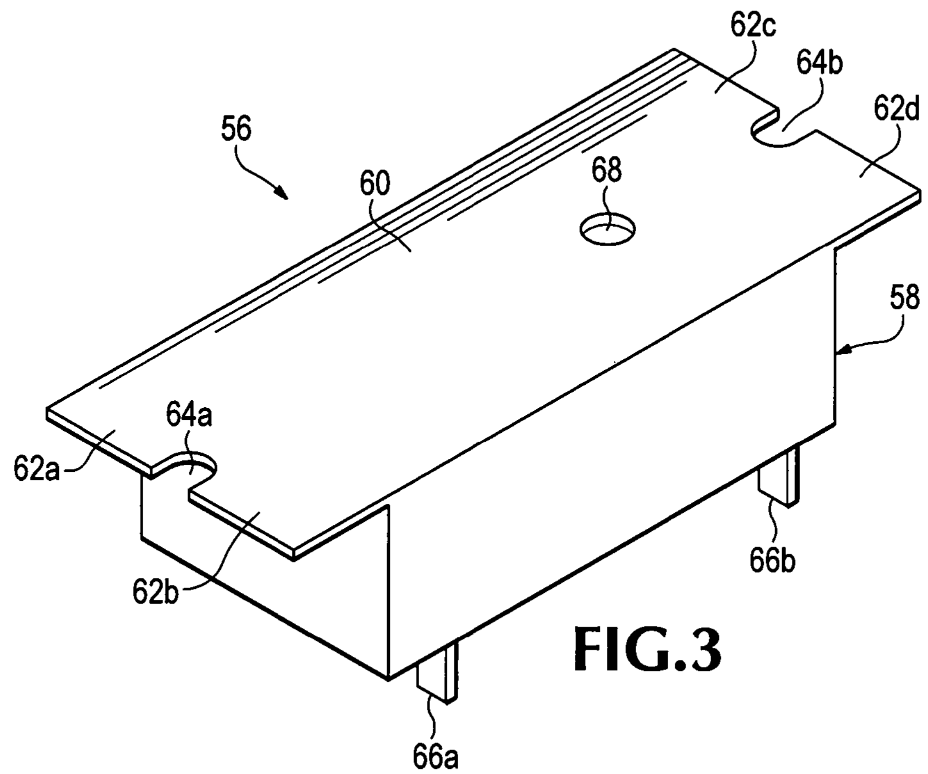
FIG. 3 illustrates an embodiment of a relay according to some inventive principles of this patent disclosure.

FIG. 3 illustrates an embodiment of a relay 56 according to some inventive principles of this patent disclosure. In the embodiment of FIG. 3, a relay circuit (not shown) is encapsulated in a molded plastic case 58 having a flat mounting portion 60. The flat mounting portion includes tabs 62*a*-62*d* which form an enlarged flange at the bottom of the relay for attachment to a generally flat mounting site on a chassis. Slots 64*a*,64*b* are formed between the tabs on either side of the flange to accommodate screws or other fasteners to attach the relay to the chassis. Electrical connections are made to the relay through terminals 66*a*,66*b* which protrude through the top of the case 58. A vent hole 68 enables gases or other material to escape from within the case 58. The vent hole 68 may be sized and located to align with a corresponding passage in the mounting site of the chassis. Although not limited to any particular application, the embodiment of FIG. 3 may be suited for use in the embodiment of the relay panel of FIG. 2.

Figure 4:
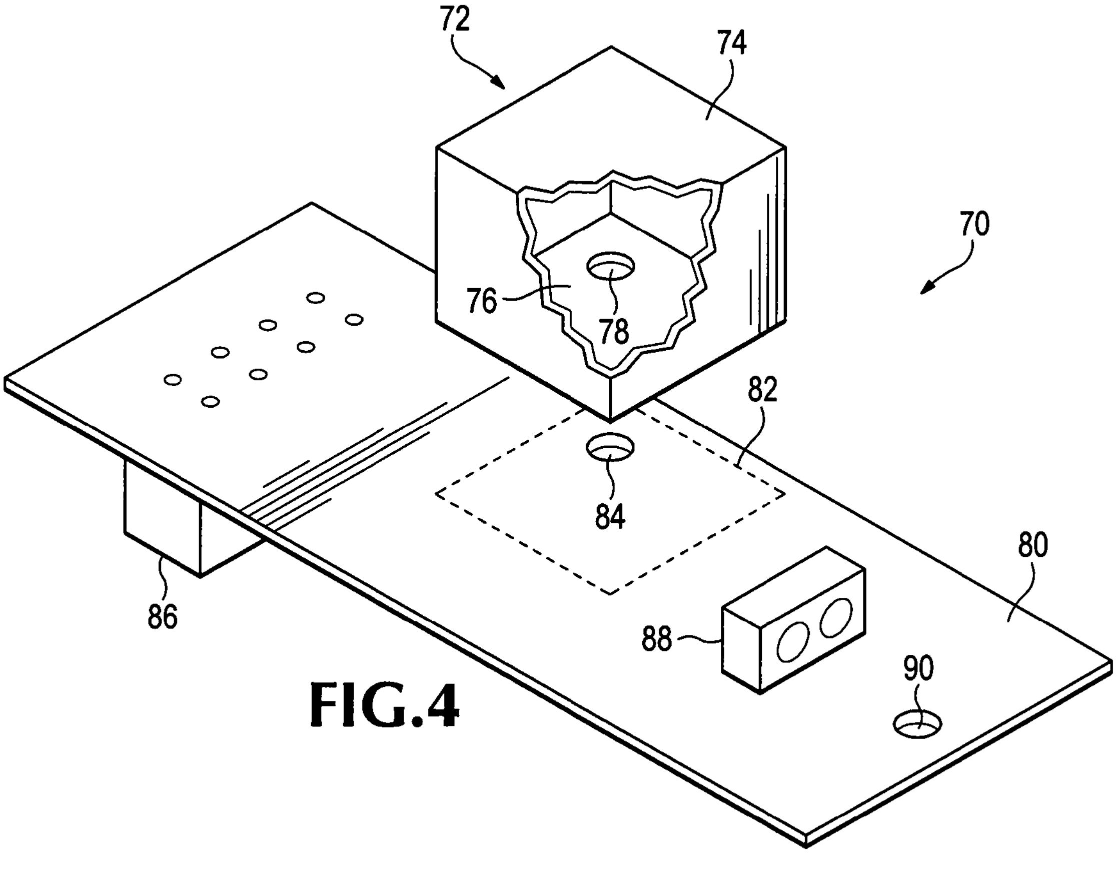
FIG. 4 illustrates an embodiment of a relay card according to some inventive principles of this patent disclosure.

FIG. 4 illustrates an embodiment of a relay card according to some inventive principles of this patent disclosure. The relay card 70 of FIG. 4 includes a relay 72 having a case 74 with a mounting portion 76, which in this example is the bottom of the case 74. The mounting portion includes a vent 78 to enable gases and other material from a blast to escape from within the case. The relay 72 is attached to PC board 80 at a mounting site 82 which includes an additional passage or vent 84 to enable the blast to pass through the printed circuit board. A terminal header 86 on the bottom of the PC board engages terminal pins on a control PC board to couple the relay coil and other circuitry on the relay board to low-voltage control circuitry on a control PC board, or to other control circuitry. A terminal block 88 enables high-voltage wiring to be connected to the contacts of the relay 72 through traces on the PC board. Connections to the relay are through terminals (not visible in this view) on the bottom of the case 74 which may be soldered to contacts, plated holes, etc., on the PC board.

The relay card 70 of FIG. 4 maybe mechanically supported at one end by the terminal header 86 and at the other end by a standoff attached to a mounting hole 90. If the terminal card of FIG. 4 is used in a system such as the relay panel shown in FIG. 2, the blast from vents 78 and 84 may be further directed through a corresponding hole 42 in the mounting plate 28. A tube or other blast directing device may be included between the PC board and the mounting plate to form a continuous passage between vents 78 and 84 and hole 42 in the mounting plate 28.

Figure 5:
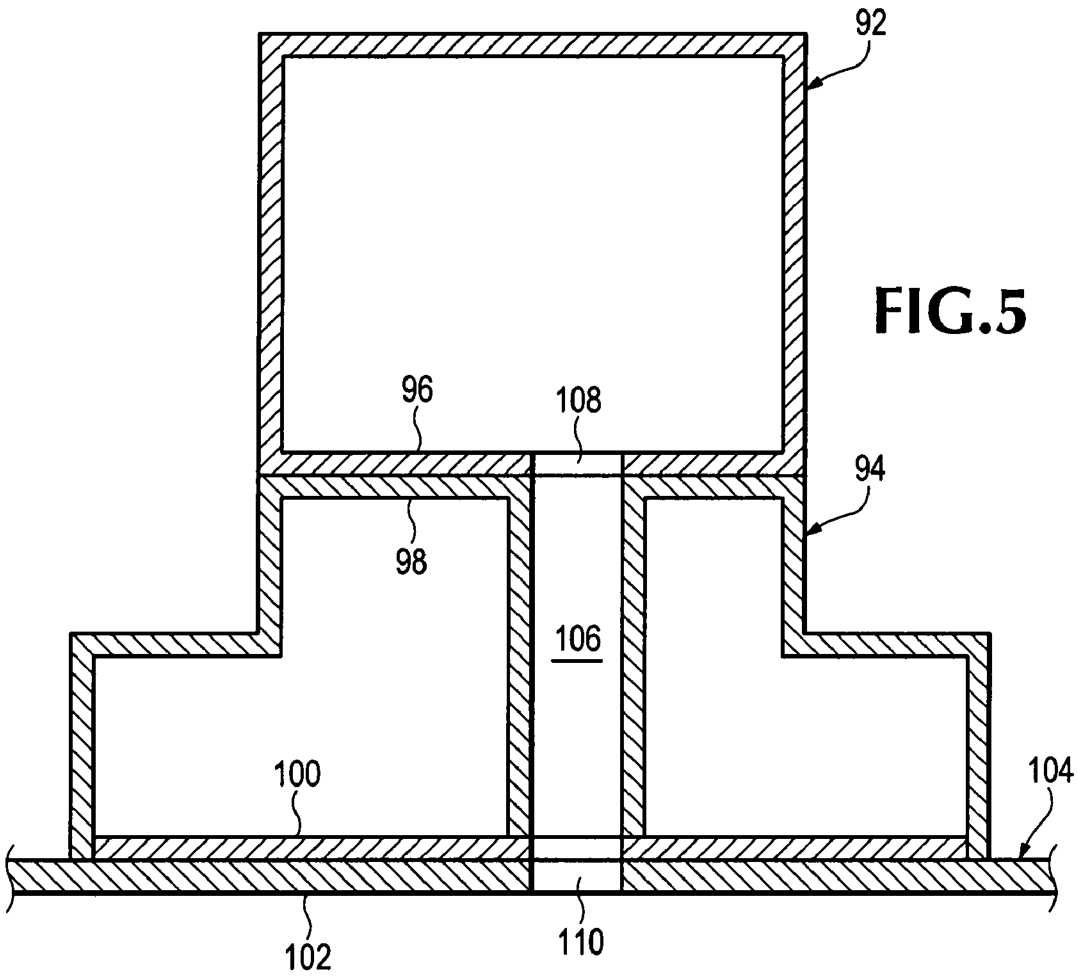
FIG. 5 is a cross-sectional view illustrating another embodiment of a venting system according to some inventive principles of this patent disclosure.

FIG. 5 illustrates another embodiment of a venting system according to some inventive principles of this patent disclosure. The embodiment of FIG. 5 includes a relay 92 similar to the relay 72 of FIG. 4. Rather than being mounted to a PC board, however, the relay 92 is mounted in a plug-in relay socket 94. Though not shown in FIG. 5, electrical and mechanical connections are made through terminal pins or spades that protrude from the bottom mounting portion 96 of the relay 92 and extend through openings in a mounting site 98 of the socket to engage receptacles in the socket. The socket 94 also includes a bottom mounting portion 100 that mounts to a mounting site 102 on a plate 104 or other additional chassis.

In the embodiment of FIG. 5, the socket 94 is formed with a through-passage 106 to connect vent 108 in the bottom of the relay 92 with a passage 110 in the plate 104. This provides a continuous passage to channel a blast from the relay through the socket and plate and into a blast chamber. In an alternative embodiment, the socket itself may include a blast chamber, in which case, the bottom of the socket may be closed, or have a reduced aperture to enable only a portion of the blast to pass through the socket and plate.

Figure 6:
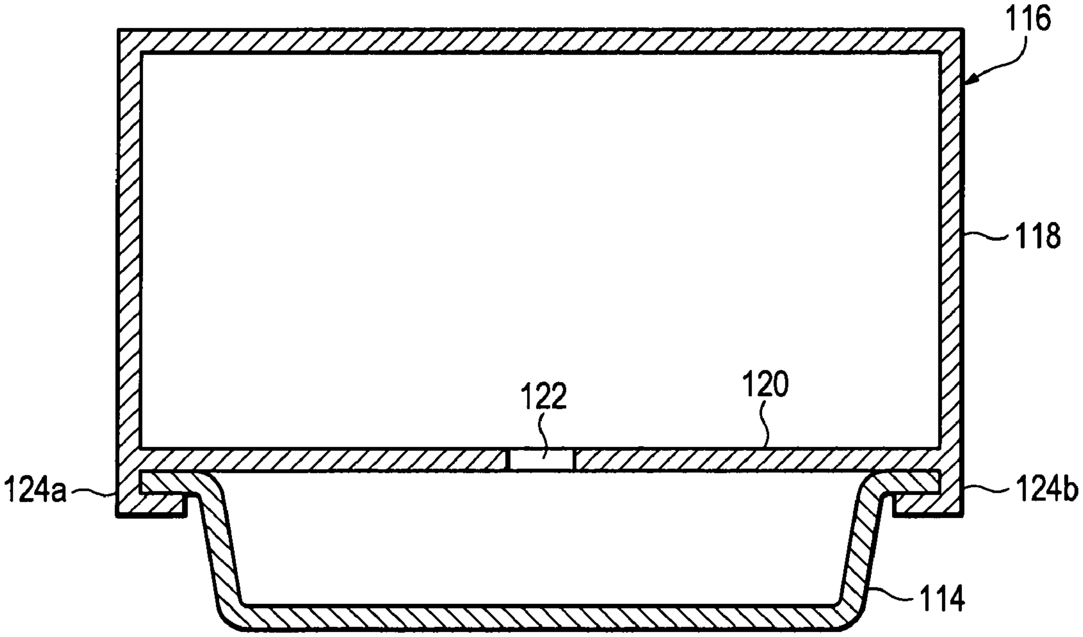
FIG. 6 is a cross-sectional view illustrating another embodiment of a venting system according to some inventive principles of this patent disclosure.

FIG. 6 illustrates another embodiment of a venting system according to some inventive principles of this patent disclosure. The embodiment of FIG. 6 includes a mounting track or rail 114 such as a standard DIN mounting rail. An electrical switching component 116 includes a case 118 having a mounting portion 120 with a vent 122. The case is secured to the rail 114 by rail-engaging members 124*a*,124*b*. The mounting site is simply the portion of the rail on which the case is mounted. In this embodiment, the rail may serve as a blast chamber, either alone, or by directing the blast to one or more additional blast diverting spaces. Thus, the interior cavity of the rail may be filled with blast-absorbing material.

Figure 7:
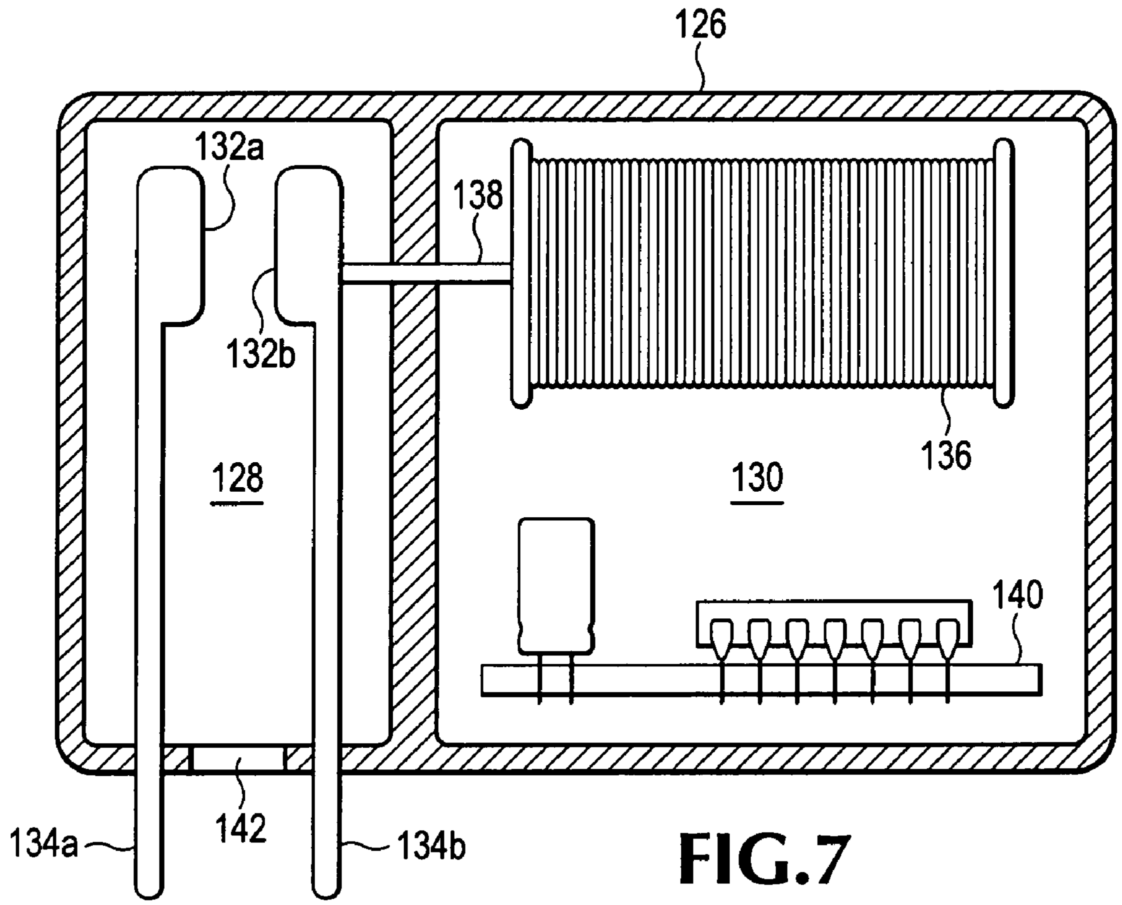
FIG. 7 is a cross-sectional view illustrating another embodiment of an electrical switching component according to some inventive principles of this patent disclosure.

FIG. 7 is a cross-sectional view illustrating another embodiment of an electrical switching component according to some inventive principles of this patent disclosure. In the embodiment of FIG. 7, a relay is housed in a case 126 having at least two chambers. A first chamber 128 contains a pair of contacts 132*a*,132*b*, or other switching element, electrically connected to terminals 134*a*,134*b* that extend through the case 126. A vent 142 enables a blast from the contacts, for example from an overload or short circuit condition, to escape from the first chamber. The first chamber may include other openings, provided a substantial portion of a blast is directed through vent 142. In some embodiments, the portion of the case having the vent 142 may be a mounting portion, which may also include the terminals 134*a*,134*b*.

A second chamber 130 includes a solenoid 136 or other actuating device to actuate the contacts using a plunger 138 that passes through a chamber wall the separates the first and second chambers. The second chamber 130 also includes electronics 140 to control the operation of the relay and communicate with external components such as a controller.

Placing the contacts 132*a*,132*b* in a separate chamber may protect the components in the second chamber from a blast from the contacts. The second chamber need not be totally enclosed, but may simply be separated enough from the first chamber to substantially protect components in the second chamber from a blast in the first chamber.

Countless variations of this embodiment are possible according to some of the inventive principles of this patent disclosure. In the example of FIG. 7, there are two chambers, but other configurations having different numbers of chambers are contemplated. Some variations may include locating the relay coil in the first chamber or a third chamber. In other embodiments, additional sets of contacts may be located in the first chamber, or the additional contacts may be located in a third chamber, fourth chamber, etc., to prevent a blast from one set of contacts from interfering with the operation of the other contacts. The additional chambers may have additional vents which may be located in the same mounting portion as the first vent, in a different mounting portion of the case, or in a non-mounting portion of the case.

Figure 8:
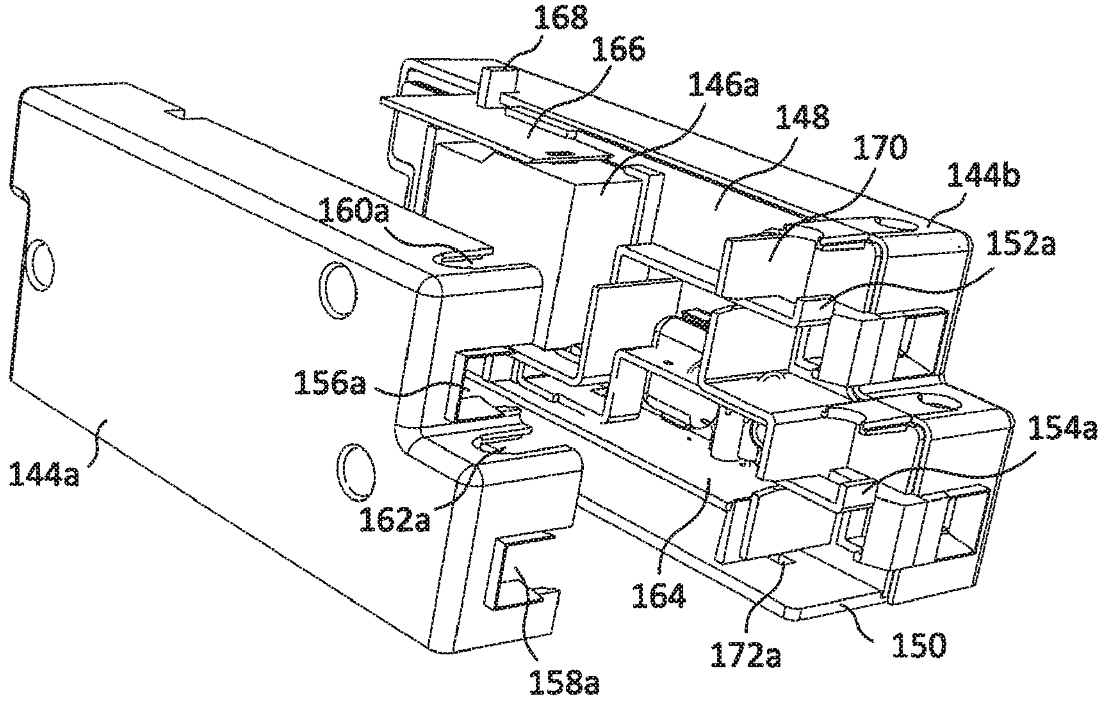
FIG. 8 is a partially exploded perspective view illustrating another embodiment of a venting system according to some inventive principles of this patent disclosure.

FIG. 8 is a partially exploded perspective view illustrating an embodiment of a relay assembly having a venting system according to some inventive principles of this patent disclosure. The embodiment of FIG. 8 illustrates a two-pole assembly, meaning that two different relays for switching two different circuits are included in one case. The case includes two side shells 144*a* and 144*b*, each of which houses one of the relays. In this view, only the left-side relay 146*a* is visible. A bulkhead 148 divides the entire case in half so that a blast on one side does not interfere with the operation of the circuitry on the other side. The case also includes a base plate 150 to mount the relay assembly to a mounting site on a plate, channel, or other suitable apparatus.

Connections to the contacts of the left-side relay 146*a* are through conductors 152*a* and 154*a*. External wires may be connected to the conductors by screw terminals (not shown) attached to the conductors. Apertures 156*a* and 158*a* allow the wires to be inserted into the terminals, while apertures 160*a* and 162*a* provide screwdriver access to the terminals. Connections to the relay solenoid and/or control electronics may be made through header pins, terminal blocks, wire leads or any other suitable arrangement. In the example of FIG. 8, the relay 146*a* is mounted to a printed circuit board 164 which includes header pins (not visible in this view) to provide connections through the case to the relay solenoid and/or control electronics on the circuit board. A slider plate 166 moves manual override actuators simultaneously on both relays in response to motion of a manual actuator 168 which protrudes through an opening in the case.

In the event of a blast from relay 146*a*, another bulkhead 170 prevents the blast from exiting the terminal apertures 156*a*-162*a* (which may damage the external wires) and instead directs the blast through a vent 172*a* in the base plate 150. Another vent 172*b* (not visible in this view) is arranged in a similar location on the other side of the base plate to vent a blast from the relay 146*b* on the other side of the case.

Relay 146*a* may be an open frame device, or it may be contained within another (inner) case as shown here. The inner case may have a single chamber, or it may have multiple chambers as describe above in the context of FIG. 7. The inner case may be designed to rupture in the event of a blast, in which case the gases and/or other material from the blast flow through the open spaces within the outer case 144*a*,144*b*,150 until they are directed to the vent 172*a*. In some embodiments, additional bulkheads, passages, baffles, etc. may be arranged within the outer case to channel the blast to the vent. Alternatively, the inner case may be designed to expel a blast in a more controlled manner. For example, the inner case may include a vent in a mounting portion, or any other portion, which may be oriented to direct a blast in the general direction of the vent 172*a*, either directly through any open space in the outer case, or through a system of additional bulkheads, passages, baffles, etc.

Figure 9:
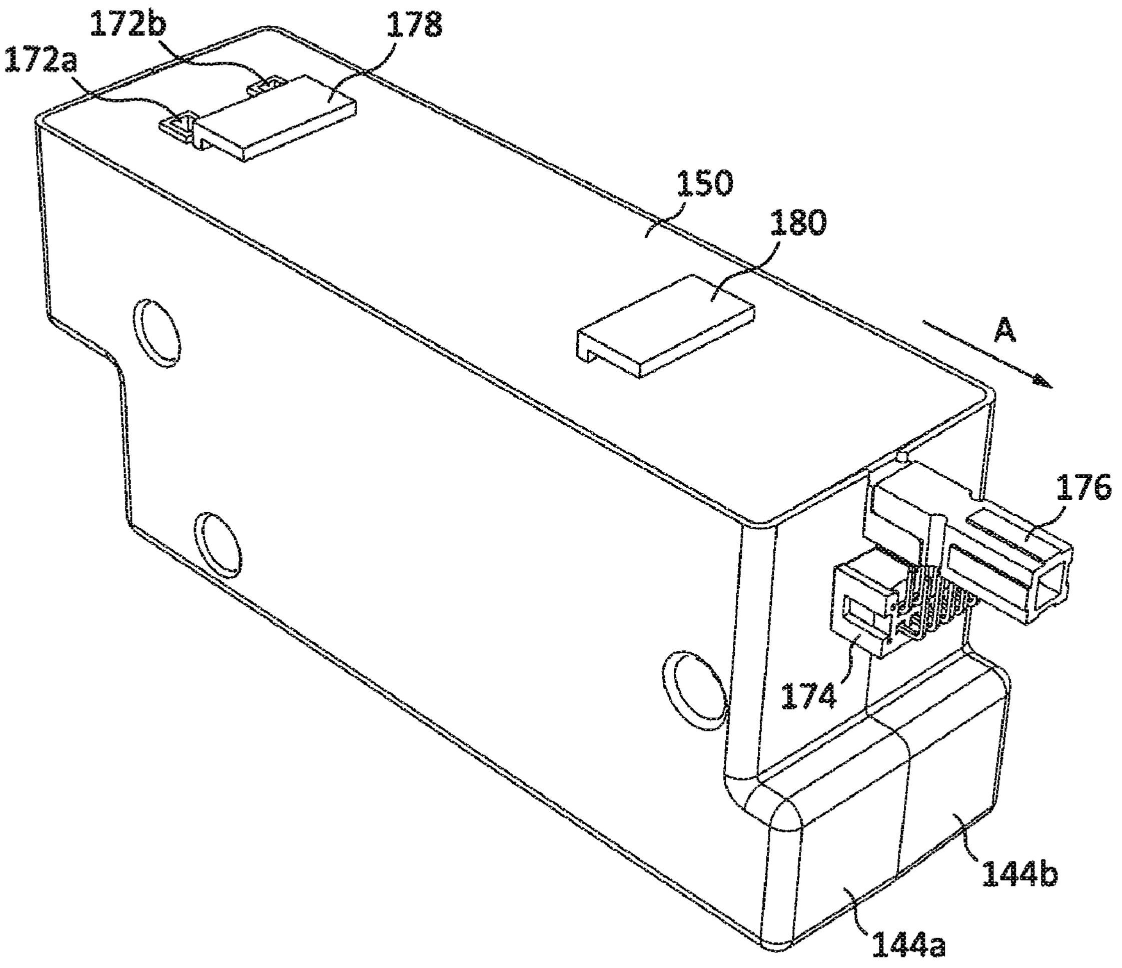
FIG. 9 is a perspective view showing the opposite side of the embodiment of FIG. 8

FIG. 9 is a perspective view showing the opposite side of the embodiment of FIG. 8. In the view of FIG. 9, both of vents 172*a* and 172*b* are visible in the base plate 150, and both case shells 144*a* and 144*b* are shown in their assembled positions. A right angle header 174 is shown in the position it is in when the header pins for the solenoid/control connections are fully engaged with the header. The right angle terminals extending from the header 174 may be soldered to a circuit board (not shown) on which control circuitry is located. For example, control circuitry 36 shown in FIG. 2A may be interfaced to the embodiment of FIG. 9 through header 174. Another connector 176 may be included to provide additional or alternative mechanical and/or electrical connections to the relay assembly.

In the embodiment of FIG. 9, the base plate 150 includes mounting ears 178 and 180 which may pass through apertures in a mounting plate and engage the plate the secure the relay assembly to a mounting site on the plate when the relay assembly is slid in the direction of arrow A. This sliding action may also cause the terminal pins to engage in header 174, and may additionally cause connector 176 to engage the case of the relay assembly. The vents 172*a* and 172*b* are located relative to mounting ear 178 such that, after the mounting ear passes through an aperture on the mounting plate and the relay assembly is slid into position in the direction of arrow A, the aperture is then positioned over the vents to enable the vents to communicate with the space on the other side of the mounting plate. Thus, the one aperture in the mounting plate operates synergistically as both a passage to vent a blast, and an aperture to engage the mounting ear 178.

Although the example embodiment of FIGS. 8 and 9 is shown as a two-pole relay assembly, other embodiments may be realized with relays, circuit breakers, or other switching devices, and with any number of poles, e.g., single pole, three-pole, etc. Moreover, any number of switch states or positions may be used, for example, single throw, double throw, etc.

The inventive principles of this patent disclosure have been described above with reference to some specific example embodiments, but these embodiments can be modified in arrangement and detail without departing from the inventive concepts. For example, in some embodiments, a printed circuit board may be part of the electrical switching component, while in other embodiments, a printed circuit board may be all or part of a chassis to which the component is mounted. As another example, the switching device need not be a simple on-off device, but may provide continuous control such as that provided by an SCR, triac, transistor, etc. Such changes and modifications are considered to fall within the scope of the following claims.

The invention claimed is:

1. An electrical component comprising:

an electrical switching device to control current to a load; and a case arranged to substantially encapsulate the electrical switching device;

wherein the case includes a mounting portion having a vent; and wherein:

the case comprises first and second chambers;

the vent is to vent a blast from within the first chamber; and the electrical switching device includes a switching element within the first chamber.

2. The component of claim 1 wherein the vent comprises a hole.

3. The component of claim 1 wherein the vent comprises a portion of the case to open in response to pressure within the case.

4. The component of claim 1 wherein the mounting portion comprises a substantially flat portion.

5. The component of claim 1 wherein the mounting portion is to engage a socket.

6. The component of claim 1 wherein the mounting portion is to engage a rail.

7. The component of claim 1 wherein the switching element includes a pair of contacts.

8. The component of claim 1 wherein the electrical switching device includes an actuating device located in the second chamber to actuate the switching element.

9. The component of claim 8 wherein the actuating device includes a solenoid.

10. The component of claim 1 wherein the component includes electronics in the second chamber to control the operation of the switching element.

11. An apparatus comprising:

a chassis having a mounting site to mount an electrical component;

wherein the mounting site includes a passage to receive a blast from the electrical component;

the apparatus further comprising an enclosure to house the chassis and the electrical component;

wherein the chassis and the enclosure are arranged to form a blast chamber to receive the blast; and wherein:

the chassis comprises a mounting plate; and the blast chamber comprises a space between the mounting plate and a wall of the enclosure.

12. The apparatus of claim 11 further comprising blast processing material disposed within the blast chamber.

13. The apparatus of claim 11 further comprising a vent to relieve the blast from the blast chamber.

14. The apparatus of claim 13 wherein the vent is to direct the blast into a main volume of the enclosure.

15. The apparatus of claim 14 wherein the vent is spaced apart from the passage to enable the blast to substantially dissipate before being directed in to the main volume of the chamber.

16. The apparatus of claim 11 wherein the chassis comprises a mounting plate.

17. The apparatus of claim 11 wherein the chassis comprises a circuit board.

18. The apparatus of claim 11 wherein the chassis comprises a socket.

19. A system comprising:

an electrical device to control current to a load;

a case arranged to substantially encapsulate the electrical device, wherein the case includes a mounting portion; and a chassis having a mounting site to engage the mounting portion of the case;

wherein the mounting portion of the case includes a vent; and wherein the chassis forms at least a portion of a blast chamber to receive a blast from the vent; and wherein the mounting site includes a passage to direct the blast from the vent to the blast chamber.

20. The system of claim 19 further comprising an enclosure to house the chassis and the electrical component, wherein the chassis and the enclosure are arranged to form the blast chamber.

* * * * *

UNITED STATES PATENT AND TRADEMARK OFFICE

CERTIFICATE OF CORRECTION

PATENT NO. : 7,843,682 B2
APPLICATION NO. : 12/256451
DATED : November 30, 2010
INVENTOR(S) : Richard A. Leinen and Pieter Paulson It is certified that error appears in the above-identified patent and that said Letters Patent is hereby corrected as shown below:

Title Page, Item [73]:

“Levitron Manufacturing Co., Inc.” should be --Leviton Manufacturing Co., Inc.--;

Signed and Sealed this
Fifteenth Day of March, 2011

David J. Kappos
*Director of the United States Patent and Trademark Office*